Figure 1:
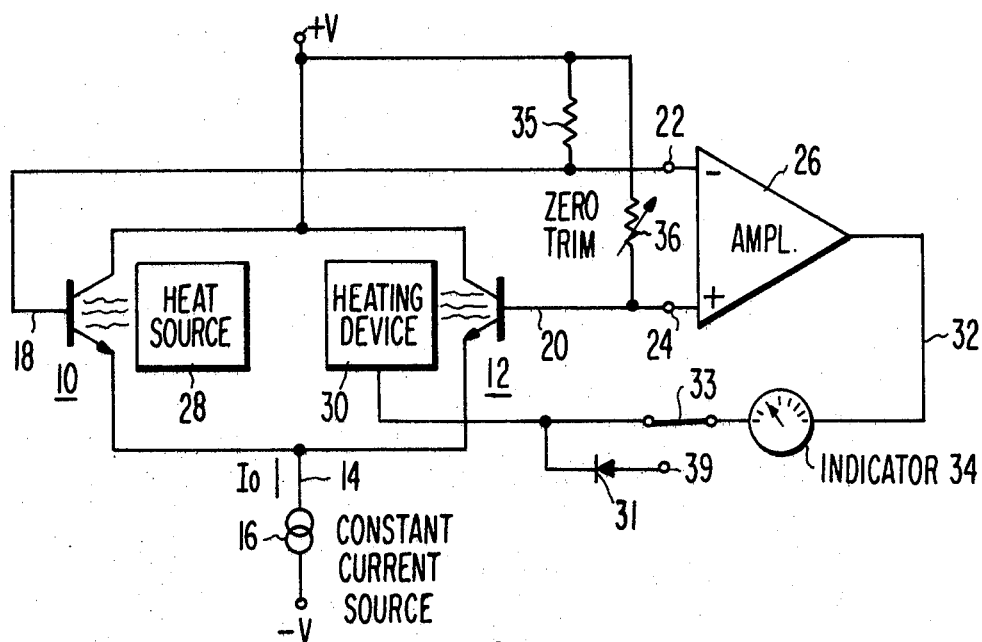

United States Patent [19]
Wittlinger

[11] 3,882,728
[45] May 13, 1975

[54] TEMPERATURE SENSING CIRCUIT
[75] Inventor: Harold Allen Wittlinger, Pennington, N.J.
[73] Assignee: RCA Corporation, New York, N.Y.
[22] Filed: Aug. 6, 1973
[21] Appl. No.: 385,645

[52] U.S. Cl. .............................. 73/362 SC; 307/310
[51] Int. Cl. .............................................. G01k 7/00
[58] Field of Search ......... 73/362 SC, 362 AR, 342; 307/310

[56] References Cited
UNITED STATES PATENTS

| | | | |
|---|---|---|---|
| 3,025,706 | 3/1962 | Oppenheim | 73/362 AR |
| 3,330,158 | 7/1967 | Simonyan | 73/362 SC |
| 3,445,777 | 5/1969 | Amodei | 330/23 |
| 3,668,428 | 8/1970 | Koerner | 307/310 |
| 3,703,651 | 11/1972 | Blowers | 307/310 |

OTHER PUBLICATIONS
Electronic Design 9, Apr. 26, 1973 page 166; Thermal Converter Raises the Accuracy of rms converter.

Primary Examiner—S. Clement Swisher
Assistant Examiner—Denis E. Corr
Attorney, Agent, or Firm—H. Christoffersen; S. Cohen

[57] ABSTRACT

One portion of a constant current is applied to one semiconductor device and the remainder to a second semiconductor device. When the temperature difference between the devices changes, the division of current also changes. An operational amplifier responsive to this division of current may be employed to drive an indicator of the temperature difference and to reestablish the original temperature difference between the devices.

10 Claims, 4 Drawing Figures

TEMPERATURE SENSING CIRCUIT

There are many process control, instrumentation and other applications in which temperature is measured by a transducer which produces an electrical signal having a parameter proportional thereto. The present application relates to relatively simple and inexpensive circuits for performing this function.

In the various embodiments of the invention, two semiconductor devices are each connected at their input electrode to a constant current source. Means connected to the output electrodes and responsive to a change in a division of the constant current between said devices which occurs when the temperature between them changes may be employed to measure and indicate this temperature difference.

Figure 2:
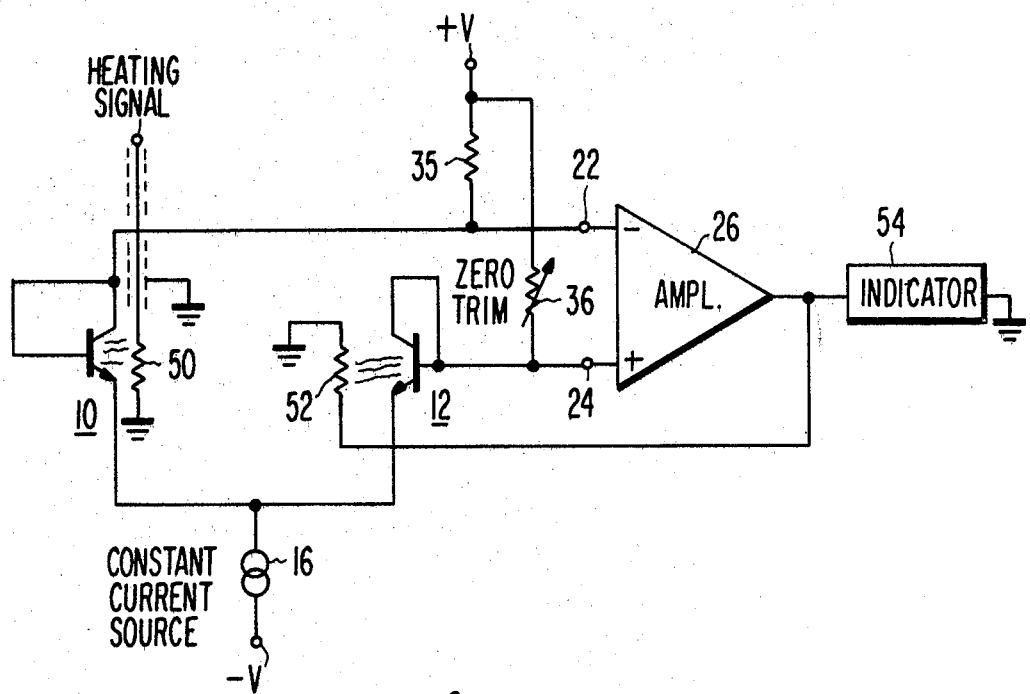
Figure 3:
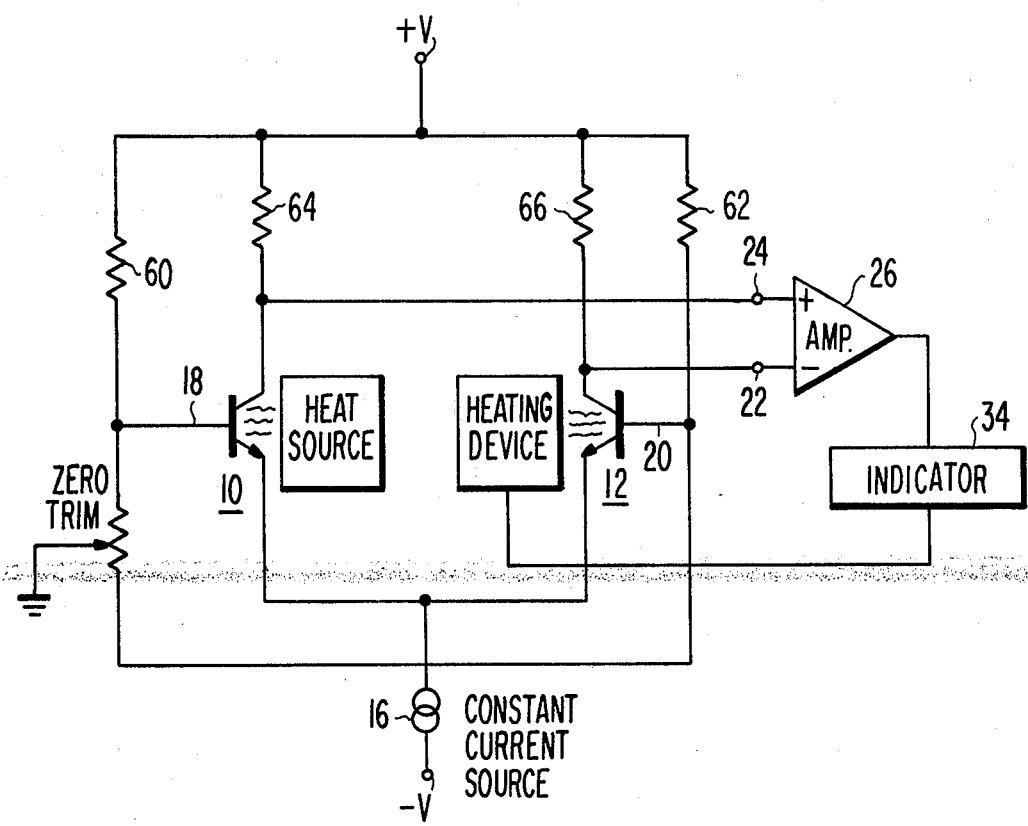
Figure 4:
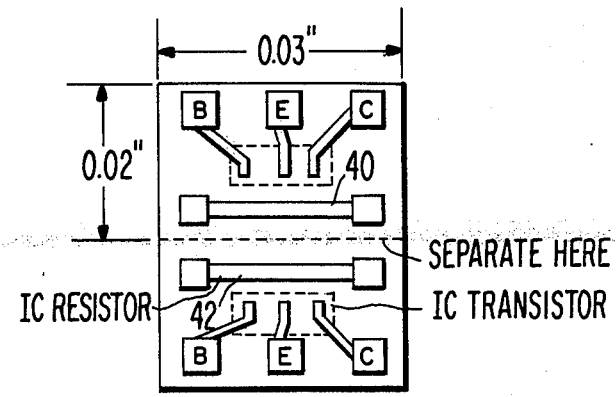

The invention is illustrated in the drawing of which:

FIGS. 1–3 are schematic circuit diagrams of three different embodiments of the invention; and FIG. 4 is a schematic showing of a preferred construction for the transistors of the circuit of FIGS. 1–3.

The circuit of FIG. 1 includes two transistors, 10 and 12 which are thermally isolated from one another. Each is connected at its emitter to one terminal 14 of a constant current source 16 supplying a current $I_o$. This source is connected at its second terminal to the negative terminal $-V$ of an operating voltage source. The transistors are connected at their collector electrodes to the other terminal $+V$ of the operating voltage source. The base electrodes 18 and 20 of transistors 10 and 12, respectively, are connected to the inverting $(-)$ and non-inverting $(+)$ input terminals 22 and 24, respectively, of an operational amplifier 26.

Transistor 10 may be the heat sensing transistor and it is located next to, that is, it is thermally coupled to, a heat source 28 whose temperature is to be measured. A heating device 30 thermally coupled to the other transistor 12, receives its energy from the amplifier 26 via negative feedback connection 32. Ideally, there is substantially no thermal coupling between heat source 28 and transistor 12 nor between heating device 30 and transistor 10. An indicator 34, which in the embodiment of FIG. 1 is shown to be an ammeter, is located in the feedback connection 32 and measures the energy supplied by heating device 30 to transistor 12.

The base currents of transistors 10 and 12, flowing in response to their respective emitter currents withdrawn by constant current source 16, flow through resistors 35 and 36, respectively, causing potential offsets from $+V$. These offsets initially may be adjusted by adjusting the resistance of zero trim resistor 36 so that when transistors 10 and 12 are both at a given reference temperature $T_o$, the output signal from amplifier 26 is zero valued. This means that at $T_o$, heating device 30 does not radiate any supplemental energy to transistor 12. When transistors 10 and 12 are similar to one another, this circuit state corresponds to a condition existing when (a) the emitter currents of transistors 10 and 12 are substantially equal (b) the base current of transistor 10 is substantially equal to that of transistor 12 and (c) the potential at point 22 is substantially equal to that at point 24. Since there is no output current from amplifier 26, the ammeter 34 will indicate no supplemental energy being radiated or conducted to transistor 12 from heating device 30.

After the adjustment above, the transistor 10 may be placed next to the heat source 28 whose temperature is to be measured. This heat source may be a resistor which is heated by an electrical signal, a conduit carrying a heated fluid or any other warm body radiating to, conducting to or otherwise heating the transistor 10 whose temperature it is desired to measure. When the heat source 28 heats the emitter-to-base junction of transistor 10 above its original temperature $T_o$, its base-emitter voltage $V_{BE}$ decreases. This action tends to make the potential appearing at terminal 14 become more positive, thereby reducing the conduction of the base-emitter junction of transistor 12 with respect to that of transistor 10. This tends to decrease the emitter current of transistor 12 with respect to that of transistor 10.

The decreased emitter-base current of transistor 12 compared to that of transistor 10 means less current flow through and therefore a smaller voltage drop across resistor 36 than across resistor 35. Thus the voltage at the input terminal 24 of amplifier 26 becomes relatively more positive and the voltage appearing at terminal 22 becomes relatively more negative.

As a result of this unbalanced condition, the amplifier 26 produces an output signal which is applied, via feedback connection 32, to the heating device 30. This output signal causes current flow via connection 32 to the heating device 30. The current becomes established at a level to raise and then maintain the temperature of the emitter-to-base diode of transistor 12 at a value substantially equal to that of transistor 10. This causes the constant current from source 16 again to be redistributed until one-half of the current again flows from the emitter of transistor 10 and the other half from the emitter of transistor 12. This returns the voltages at input terminals 22 and 24 of the amplifier to their initial values and the system is established in equilibrium.

In the equilibrium or balanced condition of the circuit, the amount of current flow in feedback connection 32 is a measure of the power supplied to heating device 30 (since current is proportional to the square root of power). On the other hand, the transistor 10 is measuring not power but temperature. Knowing the power versus temperature characteristic of device 30, meter 34 readily may be calibrated in terms of temperature. Similarly, knowing the same parameters of source 28, any temperature $T_1$ sensed at transistor 10 may be related to the power required to reach that temperature, from the initial temperature $T_o$ of transistor 10. Thus, for some applications, indicator 34 may be calibrated in terms of power. In one particular application, the heat source 28 is made as nearly identical in its characteristics as heating device 30 and this makes it possible very accurately to measure, for example, the power supplied at 28 to cause a given temperature change to occur at transistor 10. This is discussed later in connection with FIG. 4.

In other applications the temperature being measured may be indicative of some other parameter such as fluid flow. Here, the indicator 34 may be calibrated to read the flow rate directly.

In a preferred circuit according to the invention as embodied in FIG. 1 and also in the remaining figures, the two transistors 10 and 12 are integrated circuit transistors. They are preferably fabricated on the same integrated circuit die by the same processing. To provide the desired thermal isolation between transistors 10 and 12, the portions of the die upon which transistors 10 and 12 respectively appear can be cracked into separate fragments, one of which contains transistor 10 and the other of which contains transistor 12, and the fragments can be physically separated from each other. When made in this way, the two transistors have substantially identical electrical characteristics at any given temperature. Specifically, the devices will have identical base-emitter offset potential ($V_{BE}$) characteristics which will track one another with temperature and current variations. When small differences in temperatures must be detected, it is preferable to operate with such devices, and to require essentially zero current feedback to place the circuit in initial balance, as already discussed.

An integrated circuit such as discussed above is illustrated schematically in FIG. 4. The two integrated circuit transistors are indicated by the dashed blocks. FIG. 4 also shows two integrated circuit resistors 40 and 42. These resistors can be made to match to well within ± 2 percent with little difficulty and can be selected to match within a substantially lower percentage. These may be employed in applications where one of these resistors is the heat source which receives an electrical signal whose power level it is desired to measure and the other resistor is the heating device 30 of FIG. 1. The electrical signal producing the heating may be either a direct current signal, or an alternating current signal at frequencies extending into the megahertz range.

An operational amplifier such as 26 normally provides an output current of one polarity when the signal at terminal 22 is relatively more negative than that at terminal 24 (transistor 10 hotter than transistor 12) and of opposite polarity when the reverse is the case. Assume that when terminal 22 is relatively more negative than terminal 24, the direction of conventional current flow is from amplifier 26 toward the heating device 30. If the circuit is being used in an environment in which transistor 10 is never colder than transistor 12, then there is no problem. The feedback via lead 32 is negative, that is, it is degenerative, and the circuit always seeks a null condition. However, there are situations where transistor 10 can get colder than transistor 12 after the initial zero trim adjustment is made. For example, the heat source 28 may be a conduit carrying a fluid and the fluid, under some circumstances, may get colder after the initial adjustment is made. Should this occur, terminal 24 will become relatively more negative than terminal 22 and current will flow via lead 32 in the direction opposite that discussed above, that is, current will flow from heating device 30 toward amplifier 36.

A heating device does not discriminate against current flow in different directions. Thus the reverse flow of current via the feedback loop 32, as discussed above, will tend to heat the transistor 12 and this, rather than causing the circuit to seek a null condition, will instead cause the difference in temperature between transistors 10 and 12 to increase. The feedback, in other words, will be positive and the circuit will never come to equilibrium.

When the circuit of FIG. 1 is used to measure temperature in an environment such as just discussed, the positive feedback can be avoided in one of a number of different ways. One method to insure that only negative feedback occurs is to employ an amplifier which produces an output only in response to a difference of input signals of one sense. For example, a single ended transistor output amplifier such as the commercially available CA 3094 power amplifier—switch device may be employed. Another is to place a diode such as 31 in the feedback loop. This diode may be connected in the loop by throwing the arm of switch 33 to contact 39. The diode is so poled that it permits positive current flow from the amplifier toward the heating device but prevents current flow in the opposite direction. As a second alternative, a normally off electronic switch may be connected between terminals 22 and 24 which is turned on in response to any tendency for terminal 24 to become more negative than terminal 22. These various circuits for insuring that only negative feedback occurs are to be understood to be applicable to the circuits of FIGS. 2 and 3 as well as to FIG. 1.

The circuit of FIG. 2 is a modification of the circuit of FIG. 1. In the FIG. 2 circuit, each transistor 10 and 12 is connected at its base electrode to its collector electrode. Thus, each transistor operates as a diode. Attenuation of the currents supplied from source 16 to the input terminals 22 and 24 of the amplifier 26 is caused by the common-emitter forward current gain ($h_{fe}$) of transistors 10 and 12 in the FIG. 1 configuration; but the full emitter currents of transistors 10 and 12 are coupled to terminals 22 and 24 in the FIG. 2 configuration. Accordingly, the impedance levels of resistors 35 and 36 can be reduced, which lessens the susceptibility of the FIG. 2 circuit to undesirable pick-up of stray noise fields by capacitive coupling.

In other respects, the circuit operation is similar. The constant current source at 16 supplies part of its current to one of its diode connected transistors and the remainder of its current to the other diode connected transistor. The zero trim potentiometer 36 initially is adjusted to make the two currents equal at some reference temperature.

In the circuit of FIG. 2, the heating source 28 is shown as a resistor 50 which receives a heating signal. The feedback signal produced by amplifier 26 is applied to a second resistor 52. These resistors 50 and 52 may correspond to the resistors 40 and 42 of FIG. 4. The temperature indicator 54 may be a voltage indicator connected as shown, for sensing the voltage drop across resistor 52. This voltage is proportional to the square root of the power dissipated in resistor 50. Thus, if the relationship between resistors 50 and 52 is known (for example, if they are of equal value and size as in the case of the resistors 40 and 42 of FIG. 4) meter 54 may be calibrated to read power and so calibrated indicates also the power dissipated in resistor 50. Any desired waveform may be used to cause the heating of resistor 50; the power measurement will remain accurate. The voltmeter can, in any case, be calibrated to indicate true power and r.m.s. voltage conditions in resistor 50 despite being an average-power instrument. (The same would apply for an ammeter, as shown in FIG. 1.) Alternatively, the meter 54 can be calibrated to indicate the temperature of resistor 50.

The circuit of FIG. 3 is an improved version of the circuits of FIGS. 1 and 2. In the circuit of FIG. 3, the bases 18 and 20 of transistors 10 and 12, respectively, are forward biased by connecting them through resistors 60 and 62 to the positive voltage terminal +V. The collectors of transistors 10 and 12 are connected through resistors 64 and 66 to this same voltage terminal. The output signals applied to amplifier 26 are taken from the collectors of the transistors rather than from their bases.

The operation of the circuit of FIG. 3 is analogous to that of the circuits of FIGS. 1 and 2. However, because the output signals are taken from the collectors, there is amplification of the change in the $V_{BE}$ of transistor 10 provided by the transconductances of transistors 10 and 12 themselves. One important advantage of operating in this way is that the signal applied to amplifier 26 via terminals 22, 24 will be larger with respect to its internal noise and drift. Therefore, the indicator 34 will exhibit less error in response to such internal noise and drift.

Another advantage of the FIG. 3 configuration is that the base electrodes 18 and 20 of transistors 10 and 12 may be provided with optimum source impedances to reduce the internal noise of the devices. The trim circuit is isolated from the coupling of the transistors 10 and 12 to the amplifier 26 and does not affect the gain of the transistor 12 at all.

An important feature of the circuits of the present application is that the signal produced by the operational amplifier is a continuous function of the temperature being sensed by the transistor 10. This permits analog real time determination of temperature (or power).

In the use of the circuit for measuring power, the signal employed for causing the heating has a constant ratio between r.m.s. potential (or current) and average potential (or current). Therefore, a meter such as 34 or 54, which is an average reading meter, can be used to monitor r.m.s. values of potential (or current) and true power, no matter what the waveform of the heating signal happens to be.

The balanced arrangement of the present application is advantageous in that it provides common mode rejection of ambient temperature variations. Such variations, if they equally heat both semiconductor junctions, cancel. Similarly, any variation in the constant current provided by source 16 only affects the meter circuit, that is, the gain of the negative feedback loop is altered. The rebalancing of the circuit, that is, the production of sufficient feedback current to make the temperature of both junctions equal, makes the meter reading accurate despite such variations in the current from source 16.

Another feature of the circuit is its short thermal time constant—the quick change in the division of current in response to a temperature difference. This makes the "settling time" of the meter very short.

What is claimed is:

1. A measuring circuit comprising, in combination:
    two semiconductor devices, each including an input electrode and an output electrode, connected at their input electrodes, said devices being physically separated and thermally isolated from one another, the first of said devices being located next to an object whose temperature it is desired to measure relative to that of the second device and the second device being at a second location, said two semiconductor devices comprising transistors, each having an emitter electrode, a base electrode and a collector electrode, said input electrodes comprising said emitter electrodes and said output electrodes comprising said base electrodes;
    means connected to said input electrodes for applying one portion of a constant current to the first of said devices and the remainder of said constant current to the second of said devices, the ratio of said currents being a given value when the two devices are at the same temperature;
    means connected to said output electrodes for producing an output signal having a parameter at a reference value when the two devices are both at a reference temperature and responsive to a change from said given value of the ratio of the currents passing through said devices which occurs when said first device is heated by said object to a higher temperature than said second device, for producing an output signal having a parameter proportional to the change in temperature of said first device; and
    indicator means responsive to said output signal for producing an indication proportional to the value of said parameter.

2. A measuring circuit as set forth in claim 1 further including heating means thermally coupled to the second of said devices, and means responsive to said output signal and coupled to said heating means for heating the second of said semiconductor devices to a temperature at which the original temperature difference between them is reestablished, thereby reestablishing the original distribution of constant current between said devices.

3. A heat measuring circuit as set forth in claim 2 wherein said means for producing an output signal comprises an operational amplifier for producing a direct current level which is of substantially zero amplitude when the two devices are both at said reference temperature and which is at other times proportional to the temperature of said first device.

4. A heat measuring circuit as set forth in claim 3 wherein said indicator means comprises an average reading meter.

5. A heat measuring circuit as set forth in claim 4 wherein said object whose temperature it is desired to measure comprises a first integrated circuit element and wherein said heating means for said second device comprises a second integrated circuit element originally formed on the same substrate as and by the same process as the first such element and having substantially identical parameters, said first and second elements being physically separated from one another and heat isolated from one another, during operation.

6. A measuring circuit as set forth in claim 1 wherein said collector electrodes are connected together and to a source of operating voltage.

7. A temperature indicating circuit as set forth in claim 1, wherein the collector electrode of each transistor is connected to the base electrode of that transistor.

8. A temperature indicating circuit as set forth in claim 7, further including two resistors at least one of which is adjustable, one resistor connecting the base and collector electrodes of one transistor to an operating voltage terminal and the other resistor connecting the base and collector electrodes of the other transistor to said operating voltage terminal.

9. A temperature indicating circuit comprising, in combination:
    two semiconductor devices, each including an input electrode and an output electrode, connected at their input electrodes, said devices being physically separated and thermally isolated from one another, the first of said devices being located next to an object whose temperature it is desired to measure relative to that of the second device and the second device being at a second location;

means connected to said input electrodes for applying one portion of a constant current to the first of said devices and the remainder of said constant current to the second of said devices, the ratio of said currents being a given value when the two devices are at the same temperature;

means connected to said output electrodes for producing an output signal having a parameter at a reference value when the two devices are both at a reference temperature and responsive to a change from said given value of the ratio of the currents passing through said devices which occurs when said first device is heated by said object to a higher temperature than said second device, for producing an output signal having a parameter proportional to the change in temperature of said first device; and means responsive to said first device reaching a temperature lower than said second device for preventing the production of said output signal.

10. A temperature indicating circuit as set forth in claim 9 wherein said means for producing an output signal comprises an operational amplifier which produces a flow of current in one direction when the first device is heated to a higher temperature than the second device and which produces a flow of current in the opposite direction when the first device is at a lower temperature than the second device, and further including a diode coupled to the output terminal of said operational amplifier and poled to conduct current only in said one direction.

* * * * *